May 9, 1950 W. D. HANSON 2,507,440
POWER-DRIVEN AIRPLANE LANDING GEAR
Filed May 3, 1946 2 Sheets-Sheet 2
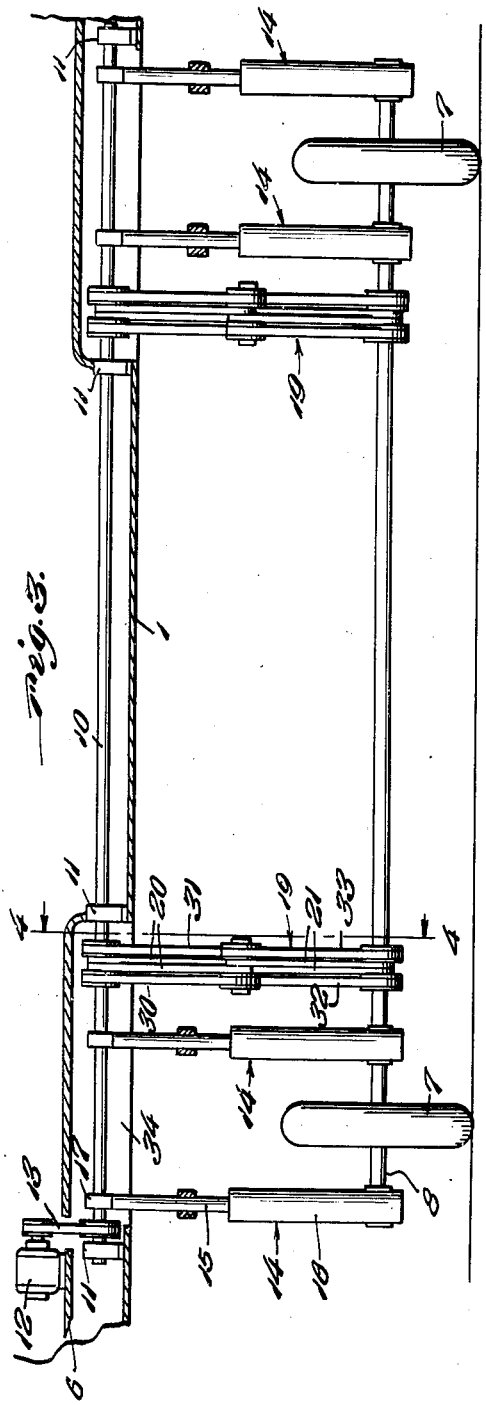
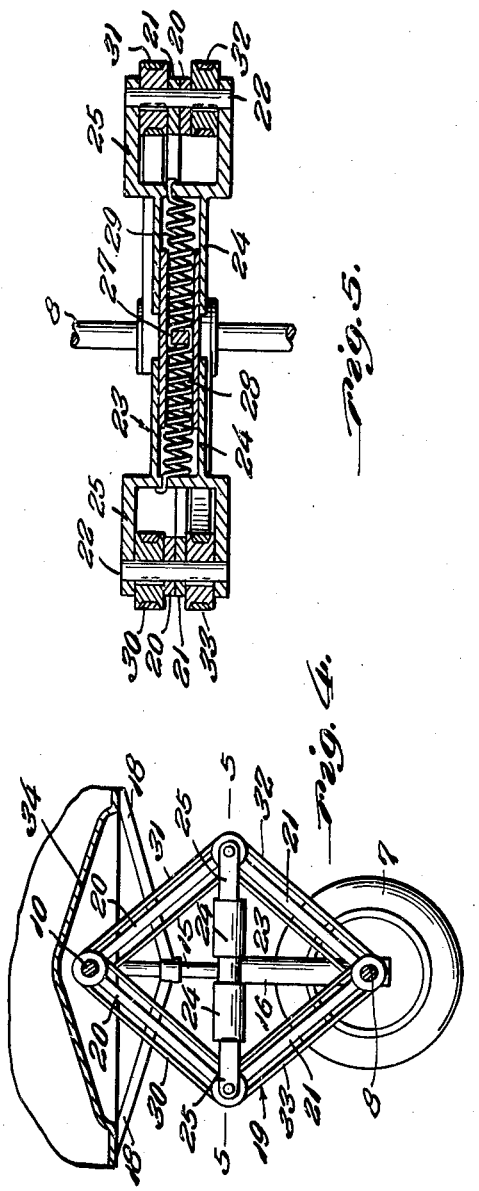
Inventor
William D. Hanson
By Clarence A. O'Brien
and Harvey B. Jacobson
Attorneys Patented May 9, 1950

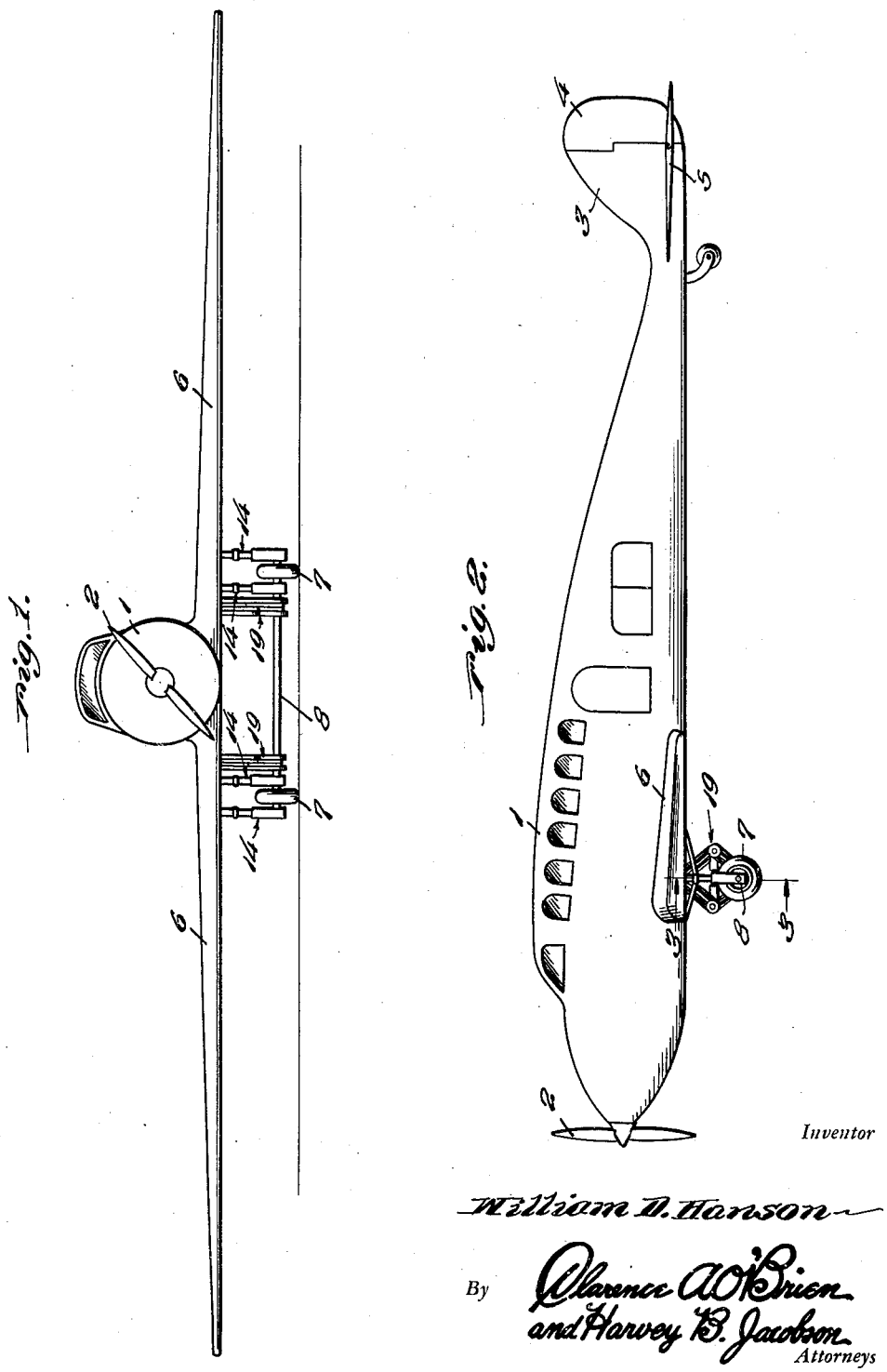

2,507,440

UNITED STATES PATENT OFFICE 2,507,440

POWER-DRIVEN AIRPLANE LANDING GEAR

William D. Hanson, Arlington, Va.

Application May 3, 1946, Serial No. 667,207

4 Claims. (Cl. 244—50)

My invention relates to improvements in airplane landing gear of the driven wheel type.

The primary object of this invention is to provide a landing gear in which the ground wheels are power driven so as to render practicable and safe quick landing and taking off, whereby short runways may be utilized in air-fields.

Another object is to provide in airplane landing gear, in conjunction with power drive of the wheels, maximum cushioning action in landing with uniform application of power to the wheels.

Still another object is to provide a power transmission between a power source and the ground wheels permitting cushioned floating action of the wheels vertically.

Other and subordinate objects, also comprehended by my invention, together with the precise nature of my improvements and the advantages thereof will be readily understood when the succeeding description and claims are read with reference to the drawings accompanying and forming part of this specification.

In said drawings:

Figure 1 is a view in front elevation of an airplane equipped with my improved landing gear, in a preferred embodiment thereof, Figure 2 is a view in side elevation, Figure 3 is a fragmentary view in vertical section taken on the line 3—3 of Figure 2 and drawn to an enlarged scale, Figure 4 is a view in vertical transverse section taken on the line 4—4 of Figure 3, Figure 5 is a view in horizontal section taken on the line 5—5 of Figure 4 and drawn to an enlarged scale.

Referring to the drawings by numerals, my improved landing gear has been shown therein, by way of exemplification, as forming equipment of a conventionally illustrated, low-wing type, airplane, 1 designating the usual fuselage, 2 the propeller, 3 the vertical fin, 4 the rudder, 5 the stabilizers and 6 the wings.

My improved landing gear, in the illustrated preferred embodiment thereof, comprises a pair of ground wheels 7 fast upon a wheel driving shaft 8 adjacent opposite ends thereof. The ground wheels 7 may be of any type desired.

A driven shaft 10 is extended through the lower part of the fuselage 1, transversely thereof, above and parallel with the wheel driving shaft 8, and with the ends thereof extended into the root part of the wings 6. Any suitable form of bearings, represented at 11, may be utilized for supporting the driven shaft 10 in the fuselage 1 and wings 6.

The driven shaft 10 is designed to be power driven from any suitable source, but, preferably, by a suitable motor 12 and a belt drive 13 from said motor to said shaft. The motor 12 may be located in one wing 6 or otherwise as desired.

Primary shock absorbing units 14 are provided for suspending the wheel driving shaft 8 from the driven shaft 10 for vertical cushioned play and which may take the form of the usual telescopic cylinders 16 and pistons 15 cushioned by the usual means, not shown, in the cylinders 16, against telescoping inwardly thereon, and having limited outward relative movement. The primary shock absorbing units 14 are arranged, preferably, in pairs at opposite ends of the wheel driving shaft 8, in upright position, with the cylinders 16 lowermost and the wheel driving shaft 8 extended through and suitably journaled against end play in the lower ends thereof. The pistons 15 are provided with upper end bearings 17 through which the driven shaft 10 extends. The pistons 15 may be suitably braced against swinging and end play of the units 14 on the driven shaft 10 by struts 18 extending forwardly and rearwardly therefrom and secured in any desired manner to the wings 6.

Power transmitting units 19, acting as secondary cushioning devices, additionally suspend the wheel driving shaft 8 from the driven shaft 10.

The power transmission units 19 each take the form, substantially, of a pendent lazy tongs embodying upper and lower pairs of links 20, 21 arranged in right angular relation, substantially, in each pair, normally, with the upper pair of links 20 having upper overlapping bearing ends through which the driven shaft 10 is journaled, the lower pair of links 21 having similarly arranged lower bearing ends through which the driven shaft 10 is journaled, the lower ends of the pair of links 20 and the upper ends of the pair 21 being pivotally connected, in pairs, by short rotatable shafts 22, all so that said pairs of links 20, 21 may straighten out, toward the horizontal, to collapse the units vertically, or, straighten out toward the vertical to extend the units in the same direction. Each power transmission unit 19 further comprises a cushioning cross connection 23 in the form of a pair of aligned tubular rods 24 having forked outer end heads 25 straddling the ends of the links 20, 21 connected by the cross shafts 22 and pivoting on said shafts, the inner ends of said rods 24 telescoping slidably over the opposite ends of a tubular coupling rod 26 having a central partition 27 therein. A pair of coil springs 28, 29 in said rods 24 and 26 and interposed between the heads 25 and said partition 27 provide for tensioning the rods 24 against sliding away from each other on the coupling rod 26, and thereby cushion collapsing movement of the links 20, 21 toward the horizontal.

A pair of belt and pulley drives 30, 31 operatively connect the driven shaft 10 upon opposite sides of the links 20, 21 to relatively opposite ends of the short shafts 22. Another pair of belt and pulley drives 32, 33 operatively connect the other ends of the short shafts 22, on opposite sides of the links 20, 21, to the wheel driving shaft 8. The belt and pulley drives 30, 31, 32, 33 operate in the forked heads 25, as shown in Figure 5.

As many of the described power transmission units 14 may be provided as may be found desirable for different types of airplanes. Preferably, however, a pair of such units 14 is provided one adjacent to each pair of the primary shock absorbing units 14, to locate the same close to the ground wheels 7.

The wings 6 may be recessed, as at 34, to expose end portions of the driven shaft 10 and accommodate therein the ends 17 of the pistons 15 and the links 20 and the belt and pulley drives 30, 31.

As will now be seen, the wheel driving shaft 8, and the wheels 7, are power driven through the instrumentality of multiple drives which are arranged for swinging action to compensate for vertical play of the ground wheels 7 while maintaining the drive connection so that the wheels may be power driven in landing and taking off to facilitate such operations, particularly by enabling the same to be accomplished quickly within a short distance. Also, the power transmission units 19 provide for cushioning vertical play of the ground wheels 7 and cushion the multiple drives against shock and jar, the cushioning action of said units supplementing the primary cushioning devices 14 without decreasing the efficiency of the primary cushioning units.

The foregoing will, it is believed, suffice to impart a clear understanding of my invention, without further explanation.

Manifestly, the invention, as described, is susceptible of modification both as regards details of construction and combination and arrangement of parts, without departing from the inventive concept, and right is herein reserved to such modifications as fall within the scope of the appended claims.

What I claim is:

1. In an airplane including a pair of ground wheels, a power drive for said wheels comprising a source of power in said airplane, and operating connections between said source and wheels comprising power transmission units constructed and arranged for collapsing and extension vertically and horizontally and including multiple belt and pulley drives connected in lazy tongs relation, and telescopic means embodied in said units for tensioning said units against collapsing.

2. In an airplane, a power driven cross shaft, a wheel driving shaft having ground wheels fast thereon, a pair of lazy tongs units in which said shafts are journaled, said units being collapsible and extensible vertically and horizontally and comprising pivotally connected links, driving connections for transmitting motion of the power driven shaft to the wheel driving shaft, said connections extending from said power driven shaft to the pivots of said links and from said pivots to said wheel driving shaft, and means embodied in said units for tensioning said units against collapsing comprising telescopic hollow connections between a pair of said pivots, and tensioning springs in said connections.

3. The combination with the fuselage of an airplane and wings on said fuselage, of a power-driven cross shaft extending through said fuselage into said wings, a pair of ground wheels, a wheel driving shaft having said wheels fast thereon, primary telescopic shock-absorbing devices for supporting said driving shaft from the driven shaft and depending out of said wings with said shafts journaled therein, and combined power transmitting devices and secondary shock-absorbing units in which said shafts are journaled and including multiple belt and pulley drives operatively connecting said driven shaft to said driving shaft.

4. The combination with the fuselage of an airplane, of a power driven cross shaft carried by said fuselage, a pair of ground wheels, a wheel driving shaft having said wheels fast thereon, primary telescopic shock absorbing devices for supporting said driving shaft from the driven shaft and depending from said fuselage with said shafts journaled therein, and combined power transmitting devices and secondary shock absorbing units in which said shafts are journaled and including multiple belt and pulley drives operatively connecting said driving shaft to said driven shaft.

WILLIAM D. HANSON.

REFERENCES CITED

The following references are of record in the file of this patent:

UNITED STATES PATENTS

| Number | Name | Date |
|---|---|---|
| 317,583 | Schulze-Berge | May 12, 1885 |
| 2,106,918 | Perazzoli | Feb. 1, 1938 |

FOREIGN PATENTS

| Number | Country | Date |
|---|---|---|
| 408,247 | France | Jan. 20, 1910 |
| 421,272 | France | Dec. 17, 1910 |